(12) United States Patent
Lin et al.

(10) Patent No.: US 8,443,013 B1
(45) Date of Patent: May 14, 2013

(54) PREDICTIVE ANALYTICAL MODELING FOR DATABASES (75) Inventors: Wei-Hao Lin, New York, NY (US);
Travis H. K. Green, New York, NY (US); Robert Kaplow, New York, NY (US); Gang Fu, Kearny, NJ (US);
Gideon S. Mann, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/246,541

(22) Filed: Sep. 27, 2011

Related U.S. Application Data (60) Provisional application No. 61/523,206, filed on Aug. 12, 2011, provisional application No. 61/513,525, filed on Jul. 29, 2011.

(51) Int. Cl.
*G06F 7/00* (2006.01)
*G06F 17/30* (2006.01)

(52) U.S. Cl.
USPC ........................................................ 707/810

(58) Field of Classification Search ................. 707/810, 707/690, 999.103
See application file for complete search history.

(56) References Cited

U.S. PATENT DOCUMENTS

| | | | |
|---|---|---|---|
| 5,271,088 A | 12/1993 | Bahler | |
| 6,243,696 B1 | 6/2001 | Keeler et al. | |
| 6,778,959 B1 | 8/2004 | Wu et al. | |
| 6,879,971 B1 | 4/2005 | Keeler et al. | |
| 7,010,696 B1 | 3/2006 | Cambridge et al. | |
| 7,054,847 B2 | 5/2006 | Hartman et al. | |
| 7,194,395 B2 | 3/2007 | Genovese | |
| 7,349,919 B2 | 3/2008 | Russell et al. | |
| 7,565,304 B2 | 7/2009 | Casati et al. | |
| 7,590,589 B2 | 9/2009 | Hoffberg | |
| 7,606,924 B2 | 10/2009 | Raz et al. | |
| 7,650,331 B1 | 1/2010 | Dean et al. | |
| 7,668,740 B1 | 2/2010 | Baggett et al. | |
| 7,689,520 B2 | 3/2010 | Burges et al. | |
| 7,788,195 B1 | 8/2010 | Subramanian et al. | |
| 7,813,870 B2 | 10/2010 | Downs et al. | |
| 7,813,944 B1 | 10/2010 | Luk et al. | |
| 7,899,611 B2 | 3/2011 | Downs et al. | |
| 7,912,628 B2 | 3/2011 | Chapman et al. | |

(Continued)

OTHER PUBLICATIONS

Weiss, Integrating Real-Time Predictive Analytics into SAP Applications [online], Dec. 30, 2009 [retrieved on Sep. 29, 2011], Retrieved from the Internet: URL:http://www.sdn.sap.com/irj/scn/go/portal/prtroot/docs/library/uuid/a07faefd-61d7-2c10-bba6-89ac5ffc302c?QuickLink=index&overridelayout=true>.

(Continued)

*Primary Examiner* — Alexey Shmatov
(74) *Attorney, Agent, or Firm* — Fish & Richardson P.C.

(57) ABSTRACT

A computer-implemented method includes obtaining a database table, the table including multiple rows and multiple columns, in which one or more rows are missing at least one column value, executing a script, using a script engine, in response to obtaining the table, in which executing the script causes one or more values from the rows to be provided as input data to a first predictive model, and processing, using the first predictive model, the input data to obtain output data, the output data including a predicted value for at least one of the missing column values, and populating one or more of the missing column values with the output data to provide a revised database table.

26 Claims, 8 Drawing Sheets

U.S. PATENT DOCUMENTS

| | | | |
|---|---|---|---|
| 7,930,266 B2 | 4/2011 | Tuv et al. | |
| 7,970,721 B2 | 6/2011 | Leskovec et al. | |
| 7,979,365 B2 | 7/2011 | Goldberg et al. | |
| 8,027,854 B2 | 9/2011 | Baggett et al. | |
| 8,065,073 B2 | 11/2011 | Downs et al. | |
| 8,065,659 B1 | 11/2011 | Prince et al. | |
| 8,090,524 B2 | 1/2012 | Chapman et al. | |
| 2002/0099730 A1 | 7/2002 | Brown et al. | |
| 2003/0145000 A1* | 7/2003 | Arning et al. | 707/3 |
| 2003/0176931 A1* | 9/2003 | Pednault et al. | 700/31 |
| 2003/0212851 A1 | 11/2003 | Drescher et al. | |
| 2005/0234753 A1 | 10/2005 | Pinto et al. | |
| 2007/0150424 A1 | 6/2007 | Igelnik | |
| 2008/0097937 A1 | 4/2008 | Hadjarian | |
| 2008/0154821 A1 | 6/2008 | Poulin | |
| 2008/0270363 A1 | 10/2008 | Hunt et al. | |
| 2008/0288209 A1 | 11/2008 | Hunt et al. | |
| 2008/0288889 A1 | 11/2008 | Hunt et al. | |
| 2008/0294372 A1 | 11/2008 | Hunt et al. | |
| 2008/0294996 A1 | 11/2008 | Hunt et al. | |
| 2008/0319829 A1 | 12/2008 | Hunt et al. | |
| 2009/0006156 A1 | 1/2009 | Hunt et al. | |
| 2009/0018996 A1 | 1/2009 | Hunt et al. | |
| 2009/0106178 A1 | 4/2009 | Chu | |
| 2010/0049538 A1 | 2/2010 | Frazer et al. | |
| 2010/0100826 A1* | 4/2010 | Hawthorne et al. | 715/745 |
| 2011/0145175 A1 | 6/2011 | Agarwal | |
| 2011/0289025 A1 | 11/2011 | Yan et al. | |
| 2011/0313900 A1 | 12/2011 | Falkenborg et al. | |

OTHER PUBLICATIONS

Hutter, et al., "Performance Prediction and Automated Tuning of Randomized and Parametric Algorithms," Principles and Practice of Constraint Programing, Lecture Notes in Computer Science, 2006, 15 pages.

SAS Rapid Predictive Modeler, Overview, 2010, 4 pages.

Postema, et al., "A Decision Support Tool for Tuning Parameters in a Machine Learning Algorithm", Nanyang Techonological University, 1997, 9 pages.

"Active learning (machine learning)," Wikipedia, the free encyclopedia, [online] [retrieved on Sep. 8, 2011]. Retrieved from the Internet: http://en.wikipedia.org/wiki/Active learning (machine learning), 3 pages.

Chandra, Tushar, "Sibyl: a system for large scale machine learning" Keynote I PowerPoint presentation, Jul. 28, 2010, ladisworkshop.org [online]. [Retrieved on Jan. 25, 2011). Retrieved from the Internet: <URL: http://ladisworkshop.org/sites/default/files/LADIS%202010%20actual.pdf>, 43 pages.

Duchi, John, et al., "Boosting with Structural Sparsity", 2009, cs.berkeley.edu [online]. [Retrieved on Jan. 25, 2011]. Retrieved from the Internet: <URL: http://www.cs.berkeley.edu/~jduchi/projects/DuchiSi09d.pdf>, 41 pages.

Duchi, John, et al., "Boosting with Structural Sparsity", Proceedings of the 26th International Conference on Machine Learning, Montreal, Canada, 2009, cs.berkeley.edu [online]. [Retrieved on Jan. 25, 2011]. Retrieved from the Internet: <URL: http://www.cs.berkeley.edu/~jduchi/projects/DuchiSi09a.pdf>, 8 pages.

R-Project web pages, 190 pages [online]. [Retrieved on May 18, 2010]. Retrieved from the Internet: <URL: http://www.r-project.org/>, 190 pages.

Uclassify web pages, [online] [Retrieved on May 18, 2010]. Retrieved from the Internet: <URL: http://www.uclassify.com/>, 16 pages.

Zementis web pages [online]. [Retrieved on May 18, 2010]. Retrieved from the Internet: <URL: http://www.zementis.com/>, 34 pages.

PMML 4.0 General Structure of a PMML Document, [online] [Retrieved on May 1, 2011]. Retrieved from the Internet: <URL: dmg.org/v4-0-1/General Structure.html>, 9 pages.

Predictive Model Markup Language, [online] [Retrieved on May 1, 2011], Retrieved from the Internet: <URL:http://en.wikipedia.org/wiki/Predictive_Model_Markup_Language>, 7 pages.

Developer's Guide—Google Prediction, [online] [Retrieved on May 6, 2011], Retrieved from the Internet: ,URL: http:www.google.com/.../developer-guide.htm>, 7 pages.

Makhtar, Mokhairi, et al., "Predictive Model Representation and Comparison: Towards Data and Predictive Models Governance", Computational Intelligence (UKCI), 2010 UK Workshop: Sep. 8-10, 2010; 6 pages.

Netuitive Announces Amazon EC2 Integration for Hybrid Cloud Performance Management [online] [retrieved on Apr. 26, 2011], Retrieved from the Internet: <URL: marketwire.com/.../Netuitive-Announc...>, 2 pages.

Google Apps Script Overview [online] [retrieved on May 6, 2011], Retrieved from the Internet: <URL: code.google.com/.../guide.html>, 4 pages.

"Google Prediction API (Labs)", Google.com, [Retrieved on May 4, 2011]. Retrieved from the Internet: <URL:http://code.google.com/apis/predict/>, 1 page.

Creative Commons Attribution-Share Alike 3.0 Unported, Cross-validation (statistics)., http://creativecommons.org., pp. 1-5.

Creative Commons Attribution-Share Alike 3.0 Unported, Winnow (algorithm)., http://creativecommons.org., 2 pages.

Bengio, Yoshua, Continuous Optimization of Hyper-Parameters, C.P. 6128 Succ. Centre-Ville, Montreal, Quebec, Canada, H3C 3J7, 7 pages.

Daelemans, Walter et al., Combined Optimization of Feature Selection and Algorithm Parameters in Machine Learning of Language, CNTS Language Technology Group, University of Antwerp, Universiteitsplein 1, B-2610 Antwerpen, Postdoctoral research of the Fund for Scientific Research, Flanders, Belgium, 12 pages.

C.E. Rasmussen & C.K.I. Williams, Gaussian Processes for Machine Learning, Model Selection and Adaptation of Hyperparameters, Chapter 5, the MIT Press, 2006 Massachusetts Institute of Technology. [Retrieved from the Internet on Oct. 18, 2011]. Retrieved from the Internet: <URL: http://www.gaussianprocess.org/gpml/chapters/RW5.pdf, 24 pages.

R. Duin, "The Combining Classifer: To Train or Not to Train?", IEEE Pattern Recognition, 2002 Proceedings, 16 International Conference, pp. 765-770.

L. Denoyer et al., "Structured Multimedia Document Classification", ACM DocEng '03, Nov. 20-22, 2003, pp. 153-160.

J. Platt et a., "Large Margin DAGs for Multiclass Classification", in Advances in Neural Information Processing Systems, S.A. Solla et al., eds., MIT Press 2000, pp. 1-7.

Potrera, Cosmin Marian, et al.; DCFMS: "A chunk-based distributed file system for supporting multimedia communication", Computer Science and Information (FedCSIS), 2011 Federated Conference on Publication Year: 2011, pp. 737-741.

McDermott, et al.: "Generating models of mental retardation from data with machine learning"; Knowledge and Data Engineering Exchange Workshop, 1997. Proceedings Digital Object Identifier: 10,1109/KDEX.1997.629850 Publication Year: 1997, pp. 114119.

English, et al.; "A grammatical approach to reducing the statistical sparsity of language models in natural domains", Acoustics, Speech, and Signal Processing, IEEE International Conference of ICASSO'86, vol. 11, Digital Object Identifier: 10.1109/CASSO.1986.1168955 Publication Year: 1986, pp. 1141-1144.

Altincay, et al.; Post-processing of Classifier Outputs in Multiple Classifier Systems:, 2002; Springer-Verlag Berlin Heidelberg; Lecture Notes in Computer Science, 2002, vol. 2364; pp. 159-168.

Altincay, et al.: "Why Does Output Normalization Create Problems in Multiple Classifier Systems?" 2002; IEEE; 16th International Conference on Pattern Recognition, Proceedings; vol. 2; pp. 775-778.

Stemmer, Georg et al.; "Comparison and Combination of Confidence Measures"; 2006; Springer-Vergal Berlin Heidelbreg; Lecture Notes in Computer Science 2006, Volum 2448; pp. 181-188.

Altincay, et al., "Undesirable Effects of Output Normalization in Multiple Classifier Systems", 2002; Elsevier Science B.V.; Pattern Recognition Letters 24 (2003); pp. 1163-1170.

Delany, et al., Generating Estimates of Classification Confidence for a Case-Based Spam Filter; 2005; Springer-Vergal Berlin Heidelberg; Lecture Notes in Computer Science, 2005, vol. 3620, pp. 177-190.

Dag Consistent Parallel Simpulation: a Predictable and Robust Conservative Algorithm, Wenton Cai et al.; Parallel and Distributed Simulation, 1997; Proceedings, 11th Workshop on Digital Object Identifier; 10.1109/PADS.1997.594604; pp. 178-181.

Stochastic Models for the Web Graph, Kumar, R. et al.; Foundations of Computer Science, 2000; Proceedings, 41st Annual Symposium on Digital Object Identifier; 11.1109/SFCS.2000.892065; pp. 57-65.

Explicit Modeling of Mode Transition Constraints for Model Predictive Control, Kobayashi, K. et al.; SICE Annual Conference, 2008 Digital Object Identifier: 10.1109/SICE.2008.4654911; pp. 1569-1574.

Research on Prediction Technique of Network Situation Awareness, Wang, et al.; Cybernetics and Intelligent Systems, 2008 IEEE Conference on Digital Object Identifier: 10.1109/ICCIS.2008.4670783; pp. 570-574.

T. Dietterich, Ensemble Methods in Machine Learning:, J. Kittler and F. Foli (Eds.), MCS 2000, pp. 1-15.

Predictive Dynamix Inc., Predictive Modeling Technology, Predictive Dynamix, Inc., 2003-2004, 5 pages.

Duin, P.W. Robert, et al., Experiments with Classifier Combining Rules, J. Kittler and F. Foli (Eds.): MCS 2000, LNCS 1857, pp. 16-29, 14 pages.

Barbieri, Maddalena Maria, et al., Optimal Predictive Model Selection, The Annals of Statistics, 2004, vol. 32, No. 3, 29 pages.

Yuan, Zheng et al., Combining Linear Progression Models: When and How? Dec. 2004, 27 pages.

Evaluating Predictive Models, 36-350, Data Mining, Principles of Data Mining, Chapter 7; Berk chapter 2, Oct. 26 and 28, 2001, 22 pages.

Google: "Google prediction API: Prediction v1.2 reference", Google Developers, 2012, retrieved from the Internet: URL: https://developers.google.com/prediction/docs/reference/v1.2/reference [retrieved on Jul. 27, 2012].

T. Green, et al.: "Prediction API: Every app a smart app", Google Developers Blog, Apr. 21, 2011, Retrieved from the Internet: URL:http//googledevelopers.blogspot.nl/2p/11/04/prediction-api-every-app-smart-app.html [retrieved on Jul. 27, 2012].

Google: "Google prediction API", Google Code, 2010, retrieved from the Internet: URL: http://code.google.com/apis/predict/ [retrieved on May 22, 2010].

International Search Report and Written Opinion for PCT Application Serial No. PCT/US2012/035862, search report completed Aug. 7, 2012, mailed Aug. 16, 2012, 112 pages.

P. Chanezon, et al.: "Google cloud for data crunchers", O'Reilly Strata Conference: Feb. 1-3, 2011 (Santa Clara, CA), Feb. 2, 2011, XP55034662, Retrieved from the Internet: URL:http://cdn.oreillystatic.com/en/assets/1/event/55/Google Cloud for Data Crunchers Presentation.pdf [retrieved on Jul. 27, 2012]; the whole document.

Cyclic Measures: "Google prediction API WinForm GUI demo", YouTube, Oct. 8, 2010, XP55034570, Retrieved from the Internet: URL:http://www.youtube.com/watch?v=m9k-zuAlPYI (retrieved on Jul. 27, 2012]; the whole document.

Google: "Google apps script: User Guide", Google Code, 2010, XP55034664, Retrieved from the Internet: URL:http://code.google.com/googleapps/apps script/guied.html [retrieved on Jan. 27, 2011] Building a User Interface.

* cited by examiner

PREDICTIVE ANALYTICAL MODELING FOR DATABASES

CROSS-REFERENCE TO RELATED APPLICATIONS

The present application claims the benefit of U.S. Provisional Patent Application Ser. No. 61/513,525, filed Jul. 29, 2011, and U.S. Provisional Patent Application Ser. No. 61/523,206, filed Aug. 12, 2011, the disclosures of which are hereby incorporated by reference in their entirety.

BACKGROUND

Predictive modeling generally refers to techniques for extracting information from data to build a model that can predict an output from a given input. Predicting an output can include predicting future trends or behavior patterns, or performing sentiment analysis, to name a few examples. Various types of predictive models can be used to analyze data and generate predictive outputs. Examples of predictive models include Naive Bayes classifiers, k-nearest neighbor classifiers, support vector machines, and logistic regression techniques, for example. Typically, a predictive model is trained with training data that includes input data and output data that mirror the form of input data that will be entered into the predictive model and the desired predictive output, respectively. The amount of training data that may be required to train a predictive model can be large, e.g., in the order of gigabytes or terabytes. The number of different types of predictive models available is extensive, and different models behave differently depending on the type of input data. Additionally, a particular type of predictive model can be made to behave differently, for example, by adjusting the hyper-parameters or via feature induction or selection.

SUMMARY

This specification relates to integration of predictive analytical modeling for application software including database management systems.

In various implementations, a prediction model application programming language interface (API) accessible through an application scripting language allows users to programmatically train and/or use predictive models within software applications such as, for instance, database management systems, calendars, electronic mail (e-mail), and word processors. For example, a script executed by a database management system can invoke a predictive model to predict missing values from a database. That is, the script executed by the database management system can provide data from the database as an input to a predictive model, which in turn predicts the missing value and updates the database. As a further example, a script executed by a database management system can obtain a dataset from a database and use the dataset as a training dataset to generate one or more customized predictive models.

In general, one aspect of the subject matter described in this specification can be embodied in computer-implemented methods that include obtaining a database table, the table including a plurality of rows and a plurality of columns, in which one or more rows are missing at least one column value, executing a script, using a script engine, in response to obtaining the table, in which executing the script causes one or more values from a plurality of the rows to be provided as input data to a first predictive model, processing, using the first predictive model, the input data to obtain output data, the output data including a predicted value for at least one of the missing column values, and populating one or more of the missing column values with the output data to provide a revised database table. Other embodiments of this aspect include corresponding systems, apparatus, and computer programs.

These and other aspects can optionally include one or more of the following features. In some implementations, the first predictive model includes a customized predictive model. The method can further include creating a customized predictive model based on a training dataset. The training dataset can include the input data. The training dataset can include data different from the input data.

In some implementations, there are at least two missing column values in at least one of the table rows. The method can further include selecting the customized predictive model from multiple different customized predictive models. The method can further include training the multiple customized predictive models, each predictive model being trained on a different arrangement of two or more missing column values in a particular table row.

In some implementations, executing the script further causes one or more values from multiple rows of the revised database table to be provided as second input data to a second predictive model, the revised database table including one or more missing column values. The method can further include processing, using the second predictive model, the second input data to obtain second output data, the second output data including a predicted value for at least one of the missing column values of the revised database, and populating one or more of the missing column values of the revised database with the second output data to provide an updated database table. Processing the first input data can include modifying a position of at least one column in the input data. Processing the second input data can include modifying a position of at least one column in the second input data. The first predictive model can be a first customized predictive model trained on a first training dataset and the second predictive model can be a second different customized predictive model trained on a second different training dataset.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

A web application is software that executes on one or more server computing devices (or "servers") and that is accessed over a network such as the Internet by users through web browsers or other software that runs on client computing devices (or "clients"). User data files that are created, accessed, or modified by web applications are stored in repositories that are accessible to the servers. Web applications can provide a graphical user interface (GUI) to client devices by sending the client devices Hypertext Markup Language (HTML) documents or other information that can be used to render the GUIs. A scripting language allows users to control some or all aspects of web applications that recognize scripts written in the scripting language. A script is a set of instructions and/or queries that are written in the scripting language. In some implementations, the scripting language is a database scripting language, e.g., a querying language such as structured query language (SQL), designed for database management systems. A database management system is a system that stores and manages data in a collection of one or more tables (i.e., databases), each table having an array of rows and columns. Other scripting languages are possible including functional and procedural programming languages. A script can be executed entirely on a client, entirely on a server, or on both the client and the server. In some implementations scripts are executed on one or more servers. Script execution can be initiated through explicit user invocation (e.g., selecting an interactive button in a GUI) or through web application activity (e.g., a database web application that calculates the value of a missing column values in a database table invokes a script upon receiving a database table with one or more missing column values).

In some implementations, the scripting language or a software library accessible from the scripting language provides a set of programmatic objects (e.g., queries) whose methods can be invoked in scripts to access functionality of web applications that run or utilized databases, such as, for example, database management systems, word processors, email, financial tools, calendars, maps, and webpage-hosting applications. (Alternatively, the functionality can be accessed through function or procedure calls rather than through method invocations.) By way of illustration, an object that represents a database management system can have methods for reading, writing and creating database files, performing calculations on data in the database tables, and, in some implementations, manipulating a database GUI such as, for instance, by opening dialog boxes, creating new database tables, expanding or reducing the size of database tables, and/or joining pre-existing database tables. The object that represents the database management system also can read, write or otherwise modify the data contained in the row or column fields of the database files.

In addition to accessing web application functionality in scripts, a predictive modeling API is provided to allow scripts to programmatically train and/or use predictive models ("models"). The predictive modeling API allows users to upload a training dataset from web application database files (or from other sources of data) and use the uploaded dataset to train a model. A model that has been trained using the uploaded dataset, or a previously trained model, can be invoked by scripts to obtain predictions for queries. Alternatively, or in addition, model training itself can be invoked by scripts. That is, a process of training a predictive modeling API can be invoked in response to a database file being uploaded to the web application. In various implementations, a prediction (i.e., the output of a predictive modeling API) is either a numeric value or a categorization of a query.

In some implementations, a training dataset includes a dataset that is specifically intended for training a predictive model. That is, the dataset is used to train a predictive model, as opposed to obtaining a prediction. Although in some implementations, the training dataset also can be provided as an input to a previously trained model to obtain a predicted value. In some implementations, a training dataset includes the input data that the user is the training dataset includes data different from the input data.

Figure 1:
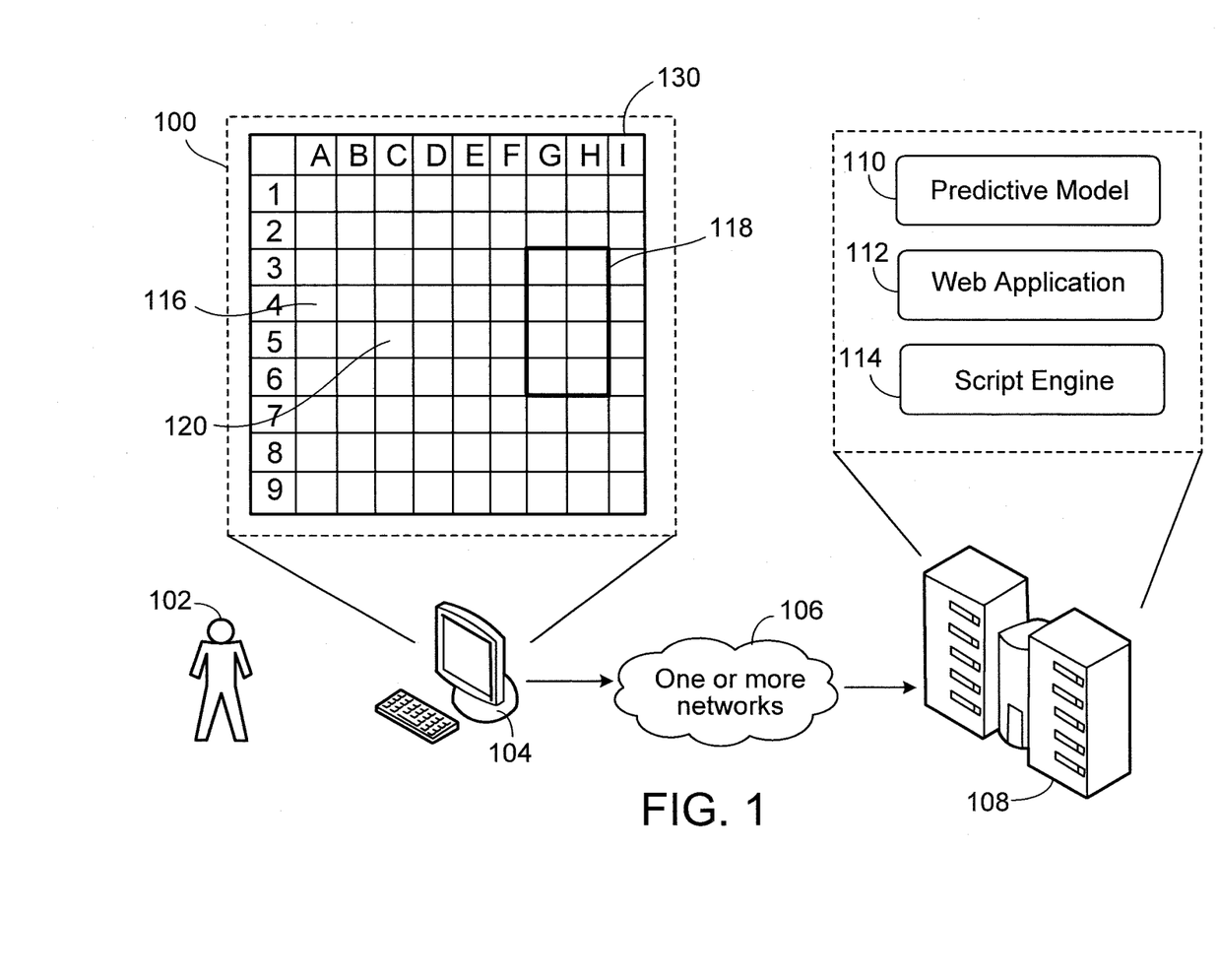
FIG. 1 illustrates use of a predictive modeling API in conjunction with an example spreadsheet web application.

FIG. 1 illustrates use of the predictive modeling API in conjunction with an example database web application. The database web application 112 software executes on one or more servers in a data warehouse 108 that houses hundreds or thousands of servers. In some embodiments, the web application 112 provides an interactive GUI 100 through a computer network 106 such as the Internet to software (e.g., a web browser) executing on a client computing device 104. The GUI 100 is displayed for a user 102 and allows the user 102 to interact with the web application 112. For example, in some implementations, the GUI 100 displays interactive fields through which a user 102 can either upload a database file from the computing device 104 to the web application 112 or download a database file from the web application 112. In some implementations, the interactive fields can be used to enter data in or obtain data from the individual row or column fields of a database file. For example, the web application 112 may include a web hosting application that hosts a web page. The web page may include multiple interactive fields in which a user can enter data. The data entered in the interactive fields then may be saved to a database table that is stored with the web application 112 on one or more servers of the data warehouse 108. The predictive modeling API also can be used in conjunction with other applications that do not require the use of an interactive GUI. For example, in some implementations, database queries can be executed using a program that operates with a command line interface, such as UNIX or MS-DOS.

As explained above, a database includes one or more tables 130, each of which includes data entry fields (e.g., fields 116 and 120) arranged in a two-dimensional array of rows and columns. Each field of a database table holds data, such as alphanumeric text or a numeric value, for example. Upon uploading a database to the web application 112, a script can be executed which, in turn, can invoke functionality of the predictive modeling API to train a predictive model from data in the database table row and column fields or calculate the value of missing row and column fields in the database table using predictions from a previously trained model. (The predictive modeling API is described further below.)

For example, the data entry fields in range 118 of a database table 130 can be extracted from the table 130 as training data to train a model 110 using the predictive modeling API in a script. In various implementations, a model is either categorical (if its predictions are categories) or regression (if its predictions are numeric). Training data comprises examples, each of which comprises one or more data values plus an answer (a category or a value) for that example. By way of illustration, the training data in TABLE 1 includes examples that are email message subject lines and a category that indicates whether each example represents SPAM or not. Alternatively, the training data can include examples that are numeric values and an answer category that is a regression of those numeric values (e.g., next value in a series)

TABLE 1

| EMAIL SUBJECT LINE | ANSWER |
|---|---|
| "You have won $$$" | "spam" |
| "Lose weight fast!" | "spam" |
| "Lowest interest rates ever!" | "spam" |
| "How are you?" | "not spam" |
| "Trip to New York" | "not spam" |

After a predictive model has been trained based on a training dataset, queries (e.g., a request to predict the value of a missing row or column) can be submitted to the predictive model 110. In some implementations, the queries are automatically submitted to the model 110 in response to a database being uploaded to the web application 112 (i.e., a script is executed such that the query is submitted to the predictive model 110 independent of a specific user request). Alternatively, in some implementations, a user uploading a database can request submission of the query to the predictive model 110. For example, the user can select an option to submit a query through the GUI 100 (e.g., by clicking a link, checking a box, selecting an option from a drop-down menu).

In some implementations, queries are similar in form to training examples: that is, a query has the same data values but does not include the answer. The trained model uses patterns that it learned from the training dataset to either find the closest category for the submitted query (if it is a categorical model) or estimate a value for the query (if it is a regression model), and returns the category or value.

Scripts are executed by a script engine 114. The script engine 114 is invoked by the database web application 112 (or other application) when a script needs to be processed. For example, when a database uploaded to the web application 112 is missing one or more values, the script engine 114 executes a script that initiates the predictive model, which determines the value(s) missing from the database. The script engine 114 is a computer program that interprets or executes scripts. In some implementations, the script engine 114 is an SQL interpreter. The script engine 114 can translate or compile scripts to an intermediate language or to a machine language before executing them. Other types of script engines are possible. Scripts that utilize functionality of the predictive modeling API can communicate with one or more predictive models 110 in order to train customized models and/or invoke the models to make predictions. The script engine 114 executes one or more scripts in response to a flag. A flag indicates to the script engine 114 that a certain action should commence. For example, in some implementations, a flag directs the engine 114 to execute script invoking the predictive modeling API to obtain one or more predictions for missing values of a database. In some implementations, a flag instructs the script engine 114 to use a specified database as a training dataset for training a predictive modeling API. The flag can be set as a result of user action. For example, a user can set a flag using an interactive field of the GUI (e.g., selecting a check box displayed by the GUI) or a user can set a flag when submitting a response to an interrogatory displayed on the GUI to the user (e.g., by clicking an icon or submitting a textual response). In some implementations, the interrogatory inquires whether the user wants to obtain a prediction value for an uploaded database. Alternatively, the interrogatory may inquire whether the user wants to use the uploaded database as a training dataset. In some implementations, the application 112 may set the flag to a default value.

By way of further illustration, the following is an example of SQL-like syntax used by script engines that can be invoked by the database web application 112:

CREATE Model_1 FROM my_table USING [columns] PREDICTING out_column

Using this syntax, a predictive model called "Model_1" is created based on a specified set of one or more columns of a database table. In the foregoing example, the specified columns are identified in square brackets whereas the database table from which the columns are obtained is labeled "my_table." The values contained in the specified columns of the "my_table" database table represent the training dataset. The parameter "out_column" specifies the particular column from the input database table that the predictive model should learn to produce based on the selected dataset of training columns (e.g., the columns specified in the "[columns]" parameter). The output column includes classification or regression labels, depending on the column selected from the input database, for each row of values in the training dataset. The newly customized predictive model can be stored in memory across the one or more servers that execute the web application, for example.

When a model is trained on a dataset that lacks one or more values, the rows containing missing values are skipped during training, i.e., the values in those rows are not used to train the model. Alternatively, the model is trained on the values that are present in the training dataset, and the missing values are then filled in using the other newly trained models.

Once a model has been trained, additional syntax can be executed to employ the customized model. The following is an example of additional SQL-like syntax used by script engines to predict new values for a database table provided as input to the web application:

PREDICT predicted_values FROM my_table USING [columns] WITH Model_1

In an example, at least one row of the input database table is missing one or more column values, i.e., one or more columns in a row contain no data. Upon execution of the foregoing syntax, the trained model (e.g., "Model_1") generates a new set of predicted values which are placed in the column "predicted_values" based on a specified dataset (e.g., identified in the square brackets) from the input database table (e.g., "my_table"). The syntax "WITH Model_1" is optional. That is, if no model presently exists or the model is not specified, a model can automatically be built based on the preexisting values contained in the database. The predicted value(s) produced by the model are used to replace the empty field(s) in the input database table. The input dataset to the model corresponds to the columns selected from the input database table whereas the new set of values ("predicted_values") corresponds to one or more columns containing the predicted values. In some implementations, columns having missing values in the input database table are entirely replaced by the new column(s) generated by the predictive model. In some implementations, only the missing fields of the input database table are replaced by the corresponding predicted values.

In some implementations, the model is trained on incomplete data. For example, the "out_column" used to train a predictive model may include one or more rows of missing values. As a result, for certain input data, the trained model either would be unable predict new value(s) or would predict new value(s) with low reliability/accuracy. In such cases, the customized model can optionally skip predicting values for rows of the input dataset where a corresponding "out_column" of the training dataset is missing a value.

TABLE 2 below shows an example set of predictive modeling API functions that can be invoked by a script engine. The predictive modeling API functionality can be exposed in scripts as methods, functions, procedure calls, or macros.

TABLE 2

| PREDICTIVE MODELING API FUNCTION | DESCRIPTION |
|---|---|
| Invoke Training | This function initiates training of a model by sending a request to a model training system (or other system). Input parameters of the function are identification of the model to train and the storage location of the training data. In some implementations, the identification of the model and the storage location of the training data are one in the same. In this case, only one input parameter needs to be provided to the function. The storage location can be a file directory path or other resource locator. In some implementations, the invoke training function is asynchronous which allows the script engine to continue execution of a script without waiting for the model training to complete. |
| Check Training Status | This function initiates a request to a model training system (or other system) to determine if model training has completed. Input parameters of the function are identification of the model to train and the storage location of the model's training data. In some implementations, the identification of the model and the storage location of the training data are one in the same. In this case, only one input parameter needs to be provided to the function. In some implementations, an additional input parameter of the function is the model type: classification or regression. If the model type is classification, a classification accuracy (e.g., a number between 0.0 and 1.0, where 1.0 is 100% accurate) can be specified as an additional input parameter for the function. The classification accuracy is an estimate, based on the amount and quality of the training data, of the estimated prediction accuracy. This can be used to decide whether the results are accurate enough to use the model for predictions. If the model type is regression, a mean squared error which is 0.0 or greater can be specified as an additional input parameter for the function. The mean squared error is the average of the square of the difference between the predicted and actual values. This is an estimate, based on the amount and quality of the training data, of the estimated prediction accuracy. This can be used to decide whether the results are accurate enough to use the model for predictions. |
| Update Training | This function updates a previously trained model. Input parameters of the function are identification of the model to be updated and the storage location of the model's updated training data. In some implementations, the identification of the model and the storage location of the training data are one in the same. In this case, only one input parameter needs to be provided to the function. |
| Predict | This function requests a prediction from a model. Input parameters to the function are a query and identification of a model that will perform the prediction. For example, the query specifies the same data as a training example without the answer. In some implementations, the identification of the model is the storage location of the training data that was used to train the model. For a categorical model, the function returns one or more categories ("labels") and corresponding scores for the query. In some implementations, the label having the largest, most positive score is the most likely match. Alternatively, the function can return a single category that best fits the query. For a regression model, a predicted value for the query, calculated based on given values in the training data, is returned by the function. |
| Delete | This function deletes a model specified in the request. |

A single script can invoke the predictive modeling API functions for multiple models. For example, a script can use one model to determine that an email message is not spam and use another model to determine the sentiment of the email message.

Figure 2:
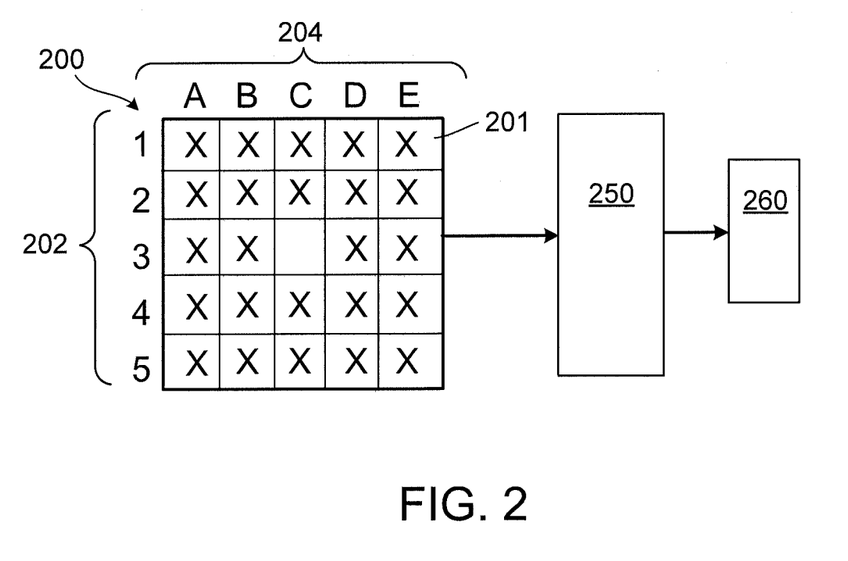
FIG. 2 is a schematic that illustrates an example of a training system used to create a predictive model.

FIG. 2 is a schematic that illustrates an example of a training system used to create a predictive model according to a first embodiment. An input database table 200 is provided to a training system 250, from which a predictive model 260 is created. The input database table 200 includes fields 201 arranged in multiple rows 202 (labeled 1-5) and multiple columns 204 (labeled A-E). In the present example, row 3 is missing data corresponding to the field in column "C." The fields in which data is present are marked with an "X." To train a predictive model capable of predicting a value for the missing column "C," one or more of the other rows that are not missing data can be selected as the training dataset. For example, rows 1-2 and 4-5, each of which includes every column value "A-E," can be selected as the training dataset on which the predictive model 260 is trained. After the predictive model 260 is created, the database table 200 can be provided as an input to the predictive model 260. The model 260 then predicts a value for the missing field in row "3" and column "C" and updates the database table 200 to include the predicted value.

In some implementations, the input database table includes multiple rows that are missing a column of data. To determine the values for the missing columns in the different rows, multiple customized predictive models are trained based on datasets having different combinations of missing values.

Figure 3A:
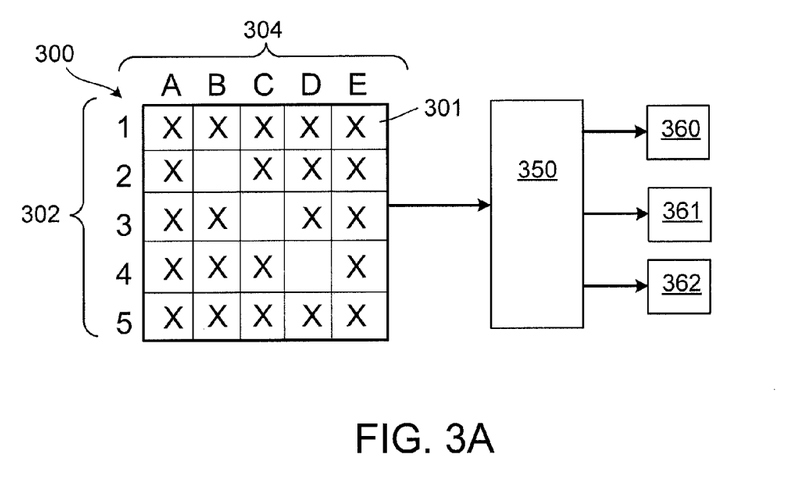
FIG. 3A is a schematic that illustrates an example of a training system used to create a predictive model.

FIG. 3A is a schematic that illustrates an example of a training system used to create a predictive model according to a second embodiment. An input database table 300 is provided to a training system 350, from which multiple customized predictive models 360, 361 and 362 are created. Although three customized models are shown, more or fewer models can be trained. The input database table 300 includes fields 301 arranged in multiple rows 302 (labeled 1-5) and multiple columns 304 (labeled A-E). The fields in which data is present are marked with an "X." In the present example, row 2 is missing data in column "B," row 3 is missing data in column "C," and row 4 is missing data in column "D." To determine the missing values, multiple different training datasets are selected on which the customized predictive models 360, 361 and 362 are trained. For example, a first dataset includes the column values from each row that has a value in column "B" (e.g., rows 1, 3, 4 and 5 of database table 300). The first customized model 360 is trained based on this first dataset. A second customized predictive model 361 is trained on a dataset that includes the column values from each row having a value in column "C" (e.g., rows 1, 2, 4, and 5). A third customized predictive model 362 is trained on a dataset that includes the column values from each row having a value in column "D" (e.g., rows 1, 2, 3, and 5). As a result, multiple different customized models are available to predict values of missing fields in the database table. Accordingly, one or more customized predictive models then may be applied to obtain prediction values for an input database table that includes multiple missing values across different rows. In some implementations, the training system 350 automatically determines that multiple models should be produced based on the existence of missing values across different columns of the database table.

Figure 3B:
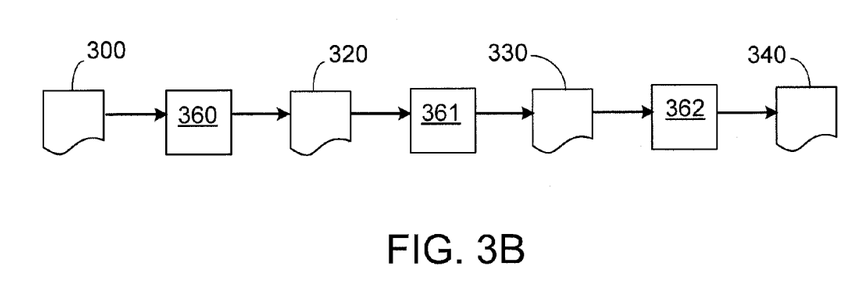
FIG. 3B is a schematic that illustrates updating a database table using different customized predictive models.

FIG. 3B is a schematic that illustrates an example of updating a database table using the different customized predictive models. After uploading database table 300 to a web application, a script is executed that invokes the different predictive models 360, 361 and 362. When the database table 300 is passed to a first predictive model 360, the customized model 360 predicts a value for the missing field in column "B" of row 2 and updates the database table to include the new value, creating a revised database table 320. The revised database table 320 then is passed to the second predictive model 361, which proceeds to predict and fill in the missing value for column "C" of row 3 to produce a revised database table 330. Finally, the revised database table 330 that now includes values that were missing for columns "B" and "C" is passed to predictive model 362, which proceeds to predict and fill in the missing value for column "D" to produce a revised database table 340.

In some implementations, the input database table is missing multiple values in a single row. To determine the values for the missing columns in the same row, a single customized predictive model can be trained to fill in the missing values simultaneously. Such a model would be trained similar to the model described with respect to FIG. 2. For example, if both columns "B" and "D" were missing in row 3 of the database table 200, a customized predictive model is trained using a training dataset that includes rows 1-2 and 4-5 of database table, where each row in the training dataset includes the values "B" and "D" as well as the other elements in the row. When the database table 200 then is passed to the predictive model, the model produces both a predicted value for column "B" and for column "D" of row 3 and revises the database table 200 accordingly.

Figure 4A:
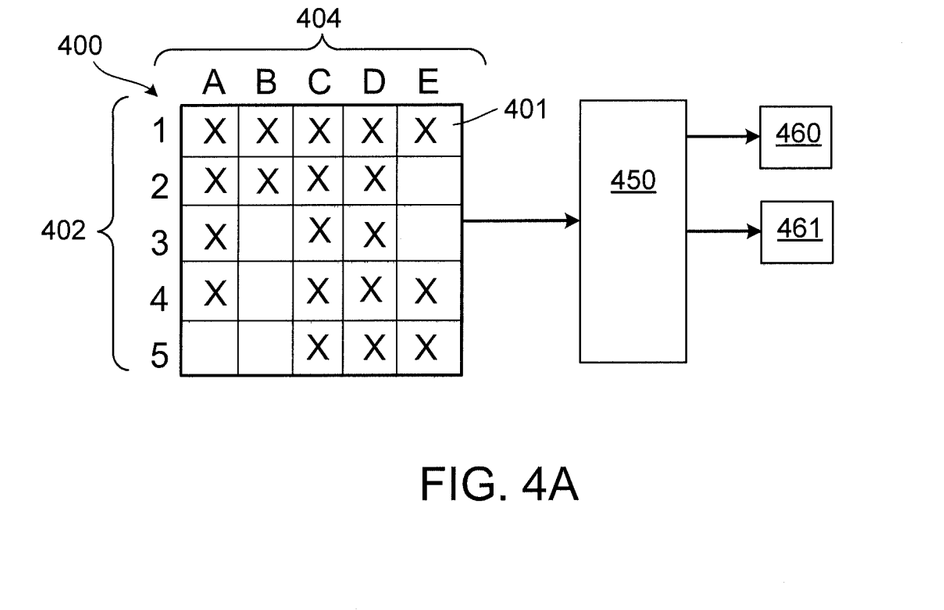
FIG. 4A is a schematic that illustrates an example of a training system used to create a predictive model.

In some implementations, multiple predictive models are employed in series, in which each model predicts a single missing value for a row in the database table. FIG. 4A is a schematic that illustrates an example of a training system used to create a predictive model according to a third embodiment. An input database table 400 is provided to a training system 450, from which multiple customized predictive models 460 and 461 are trained. Although two predictive models are shown, more or fewer predictive models can be created by the training system 450. The input database table 400 includes fields 401 arranged in multiple rows 402 (labeled 1-5) and multiple columns 404 (labeled A-E). The fields in which data is present are marked with an "X." In the present example, row 3 is missing data in column "B" and data in column "E." To train the first predictive model 460, a first training dataset is selected. The first training dataset is based on rows that contain the missing column value "B" and as many other column values that are available in the same rows (i.e., the values are input as training data to the training system 450). For example, the first training dataset 420 includes the values in rows 1 and 2 of the database table 400, in which row 1 includes values for each of columns A-E, and row 2 includes values for each column A-D. Since the value for column E is missing in row 2, that field is omitted from the first training dataset 420. To train the second predictive model 461, a second training dataset 422 is selected. The second training dataset 422 is based on rows that contain the missing column value "E" and as many other column values that are available in the same rows. That is, the values of the other columns in the rows that include a value for column "E" are provided as input data to the training system. For example, the second training dataset 422 includes the values contained in rows 1, 4 and 5 of the database table 400. Row 1 includes values for each of columns "A-E", row 4 includes values for columns "A" and "C-E", and row 5 includes values for columns "C-E." Since the values for column "B" are missing in rows 4 and 5, the missing values for "B" are not used to formulate a prediction for "E". Similarly, since the value for column "A" is missing for row 5, the missing value for "A" is not used to formulate a prediction for "E."

Figure 4B:
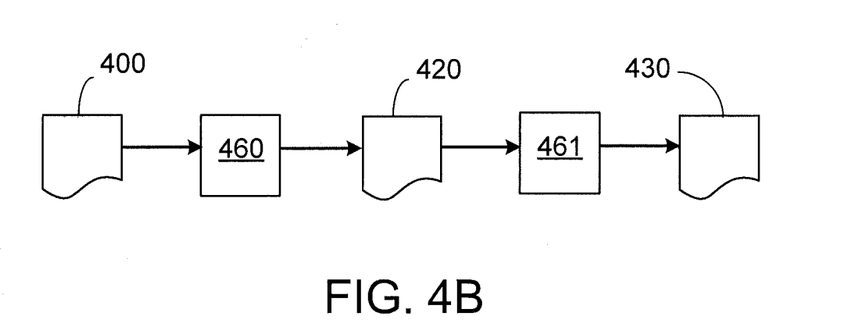
FIG. 4B is a schematic that illustrates updating a database table using different customized predictive models.

Once each of the customized predictive models has been trained, the models can be invoked in sequence to fill in the missing values of a database table. For example, FIG. 4B is a schematic that illustrates updating a database table using the different customized predictive models. Row 3 of database table 400 is missing the column values "B" and "E." After uploading database table 400 to a web application, a script is executed that invokes the different predictive models 460 and 461. The database table 400 is first passed to the first predictive model 460. The customized model 460 predicts a value for the missing field in column "B" of row 3 and updates the database table to include the new value, creating a revised database table 420. The revised database table 420 then is passed to the second predictive model 461, which proceeds to predict and fill in the missing value for column "E" of row 3 to produce a revised database table 430. Instead of filling in the missing values of the database table after all the predictive models have been generated, each predictive model can be generated separately and then applied to the database table to predict missing values for a specified column. For example, a first model can be trained that predicts the missing values for column "A." The first model then is applied to the database to fill in the missing values for "A" to provide a revised database. A second model then can be trained that predicts the missing values for column "B," in which the second model is trained based on the revised database.

When applying the predictive models in series, it can be advantageous to apply the models in an order that minimizes predictive error/increases prediction accuracy. Accordingly, in some implementations, models are applied in sequence based on the amount of user-provided data for each model. That is, if multiple columns have missing values, the model for the column with the minimum number of missing values is applied first and the model for the column with the maximum number of missing values is applied last. For example, if column "A" contains 1 missing value, column "B" contains two missing values and column "C" contains three missing values, then the model that predicts the values for column "A" is applied first, the model that predicts the values for column "B" is applied next, and the model that predicts values for column "C" is applied last.

In some implementations, a training system that trains a predictive model sequentially analyzes the column values in each row of a training dataset when creating the predictive model. For example, for each row, the training system first analyzes the value in column "A," then evaluates the value in column "B" and so forth until the end of the row is reached. If, however, the training system reaches a null or empty value in a field, prior to reaching the end of a row, the training system may, in some implementations, fail to generate a predictive model. Alternatively, the training system may create a predictive model without evaluating any remaining column values in that particular row. As a result, the predictive model created may be less reliable, given that the system failed to take into account all of the training values from the training dataset. However, if the missing value is located at the end of a row, the training system can complete the training of a predictive model without complication. Accordingly, in some implementations, the training system is configured to shift missing column values to the end of a row when analyzing a training dataset. For example, if a row contains five columns, "A-E" and column C is empty, the training system can transfer column C to the end so, only columns A, B, D and E are analyzed and evaluated when creating a predictive model.

In some implementations, a trained predictive model can be updated based on new data. For example, after a predictive model has been created from a database table, a user may add values to the table and/or change values within the table. The predictive model then can be updated based on the new values to provide predicted values based on the most recent data. Updating predictive models can include a number of operations for analyzing additional training data as well as an original predictive model, and modifying or re-creating the predictive model in view of the additional data to provide an updated predicted model. In some implementations, modifying the original predictive model can include adjusting one or more parameters (e.g., selecting a different range of values for the training dataset or selecting a different desired output column for predicted values) of the predictive model.

In some implementations, additional training data can be integrated or combined with an original training dataset (i.e., the training dataset used to train the original predictive model) to create an updated training dataset. The updated training dataset can be used to train an updated predictive model. In some examples, the updated training dataset can be modified and submitted in its modified form to the training system. For example, selected data within the updated training dataset can be "favored" over other data. In some examples, one or more bootstrapping operations can be applied to the updated training dataset. The bootstrapping operations can include assigning measures of accuracy or importance to respective training examples in the training dataset. For instance, training examples provided in the additional training data can be attributed a higher measure of importance than training examples provided in the original dataset. In this way, the updated predictive model can be biased towards more recent instances of the patterned occurrence. The opposite can be achieved by attributing a higher level of importance to training examples provided by the original dataset.

In some implementations, the training system (e.g., system 250, 350 or 450) can track values in the database table that have been filled in using the predictive model. If the user replaces the predicted values with new data, the predictive model can be updated based on the new data added by the user to enable more accurate predictions. For example, referring to FIG. 4, the predictive model 460 is trained to produce table values for column "B." The model 460 is trained on a dataset that includes values for column "B" in rows 1 and 2. If the database table is updated by the user to include a value for column "B" in row 3, then the model 460 can be retrained using the new data. As a result, future predictions of column "B" values can be more accurate.

Figure 5:
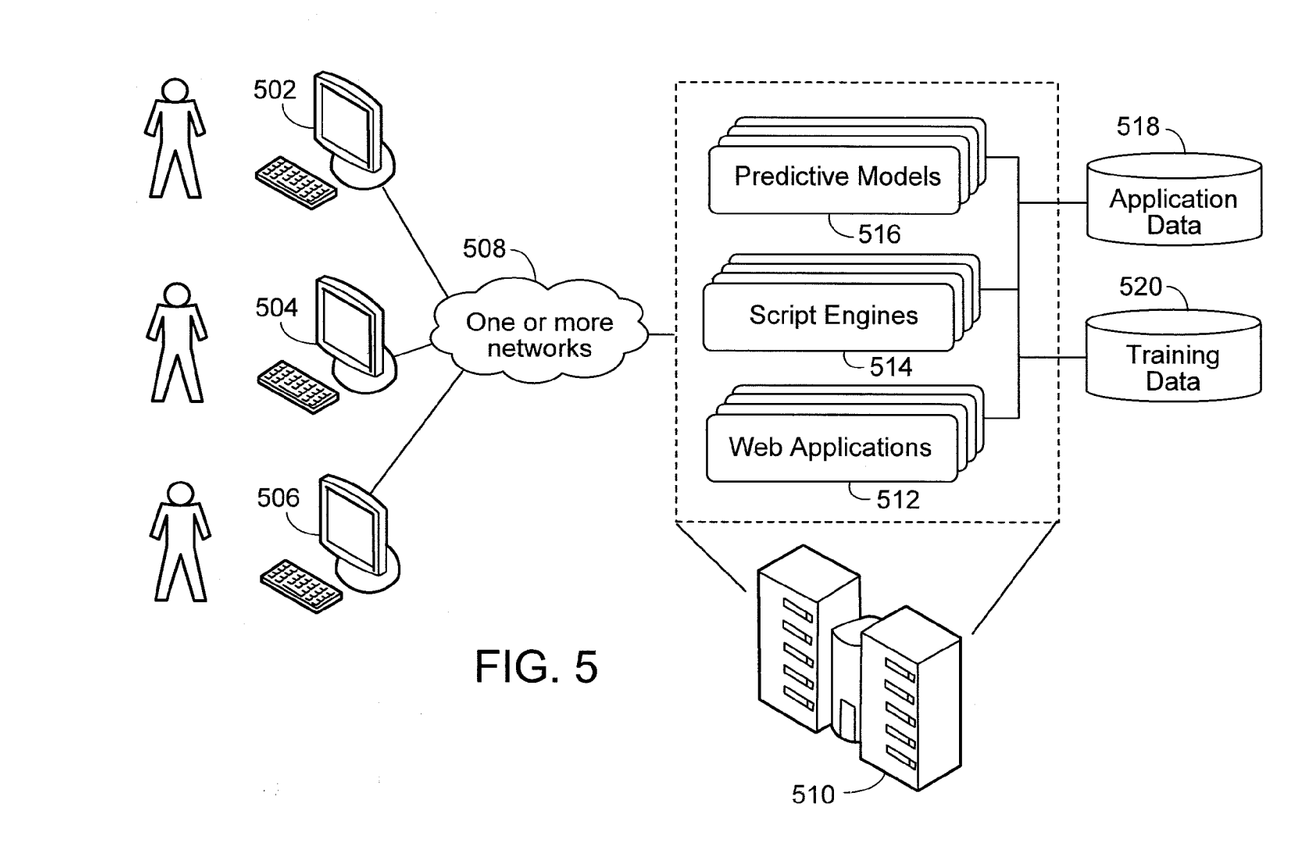
FIG. 5 illustrates an example predictive modeling system.

FIG. 5 illustrates an example predictive modeling system 500. The system includes one or more clients (clients 502, 504 and 506) that can communicate through one or more networks 508 with a collection of remote servers, such as servers deployed in a data center 510 or in different geographic locations. The servers execute computer programs that implement web applications 512, script engines 514, and predictive models 516. Web applications 512 invoke script engines 514 at various times to execute scripts. Script engines 514 allow scripts to utilize predictive models 516 for training and prediction.

A given server comprises one or more data processing apparatus. The servers can communicate with each other and with storage systems (e.g., application data storage system 518 and training data storage system 520) at various times using one or more computer networks or other communication means. For example, the servers in the data center 510 can be coupled to an intranet. A computer program can execute on a single server or, alternatively, the program can be organized into components that execute on multiple servers. There can be more than one instance or copy of a given computer program executing on the collection of servers at any given time. Multiple copies of a computer program that implements the script engine, for instance, can be executing at the same time on one or more servers providing script execution for different web applications 512. Scripts can be executed in parallel by the script engines 514. Two scripts are executed in parallel if they are executed on different servers and if at least a portion of their execution occurs at the same time. For example, assume that script A is executed by a script engine executing on server S1 and script B is executed by a script engine executing on server S2. If some period of time exists where script A and B are both being executed, then the scripts are executed in parallel.

Figure 6:
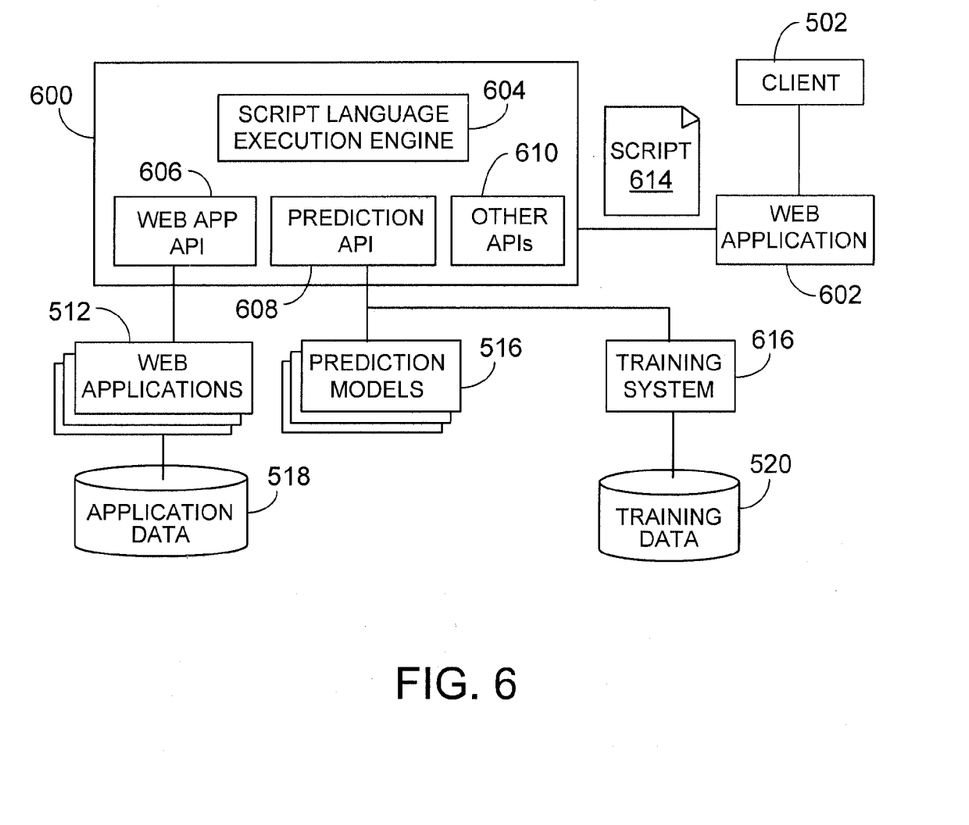
FIG. 6 illustrates an example script engine.

As an illustration, and with reference to FIG. 6, client 502 can interact with web application 602. In order to execute a script 614 the web application 602 invokes a script engine 600. The script engine 600 is a separate computer program or, in some implementations, is part of the computer program that makes up the web application 602. In either case, the script engine 600 is provided with the script (or a memory location of the script). The web application 602 and the script engine 600 can communicate through method invocation, shared memory, network communication, or other means of inter or intra-process communication. The script engine 600 includes a script language execution engine 604, a web application API 606, a predictive modeling API 608 and, optionally, other APIs (610). Scripts can contain references to interactive fields of web applications 512 as input parameters to the web application API 606 methods. Scripts can also contain references to predictive models 516 as input parameters to the predictive modeling API 608 functions. The script language execution engine 604 interprets or executes the script 614. In some implementations, the execution engine 604 is a SQL interpreter. The web application API 606 exposes functionality through objects, methods, or functions that allow scripts to utilize functionality of web applications 512 and access application data 518 such as user data files.

The predictive modeling API 608 exposes functionality through objects, methods or functions that allow scripts to query models and train models 516 using training data obtained from application data 518. In some implementations, models are trained by a training system 616 which receives requests from the predictive modeling API 608 to initiate training and check the status of training. The predictive modeling API 608 provides the training system 616 with the location of training data 520 to be used in training a particular model. For example, the training data, such as a range of cells in a spreadsheet, can be obtained from the application data 518 through use of the web application API 606 and then provided to the training system 616 through use of the predictive modeling API 608.

Other APIs 610 can include, for instance, an API that allows scripts to communicate over computer networks using Transmission Control Protocol/Internet Protocol (TCP/IP) and an authentication API which provides a mechanism for authorizing a script's request to access a user's application data 518, models 516, and training data 520 through the web application API 606 and the predictive modeling API 608. In some implementations, the web application 602 or the script engine 600 requests access permission from an authorization server. The authorization server is responsible for prompting the user (e.g., user 502a) for permission to grant access to the required data, if necessary. If permission is granted, the authorization server returns a token that can be shared with the web application 602, the web application API 606, and the predictive modeling API 608 in order to access the required data. Other authorization mechanisms are possible.

Figure 7:
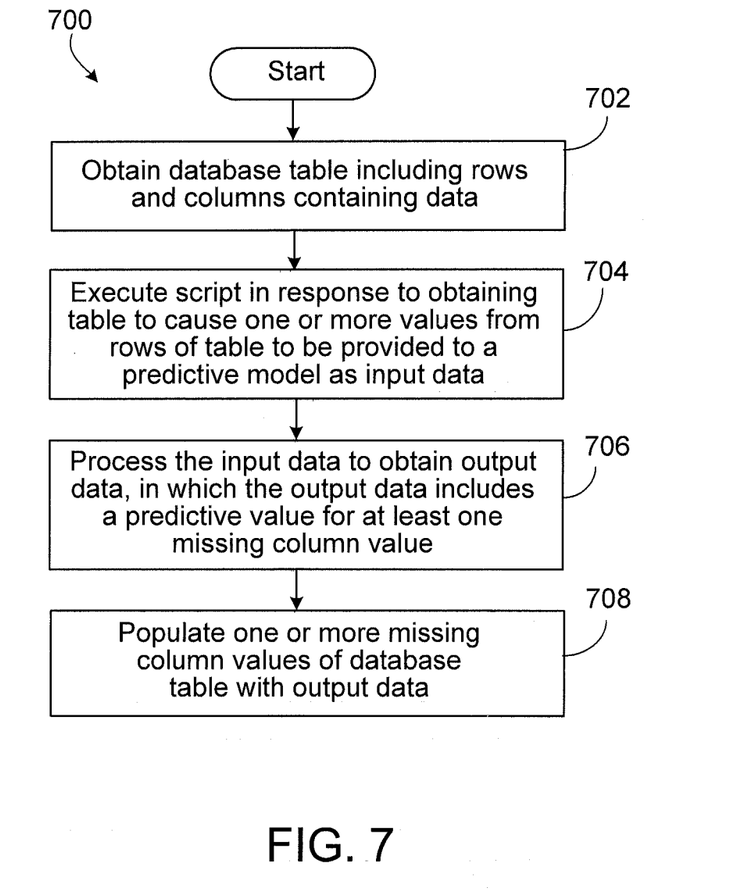
FIG. 7 is a flowchart of an example process for using predictive models.

FIG. 7 is a flow chart of an example process 700 for employing a predictive model, in which the process is implemented using one or more computer programs executing on one or more data processing apparatus such as the system shown in FIG. 1. Reference is made to the A database table is obtained (702) by the web application 112, where the table includes multiple rows and multiple columns and where one or more rows are missing at least one column value. A script is executed (704), using a script engine 114, in response to obtaining the table. Executing the script causes one or more values from the multiple rows to be provided as input data to a first predictive model 110. Using the first predictive model 110, the input data is processed (706) to obtain output data, in which the output data includes a predicted value for at least one of the missing column values. Using the predictive model 110, one or more of the missing column values of the database table is then populated with the output data to provide a revised database table (708).

Figure 8:
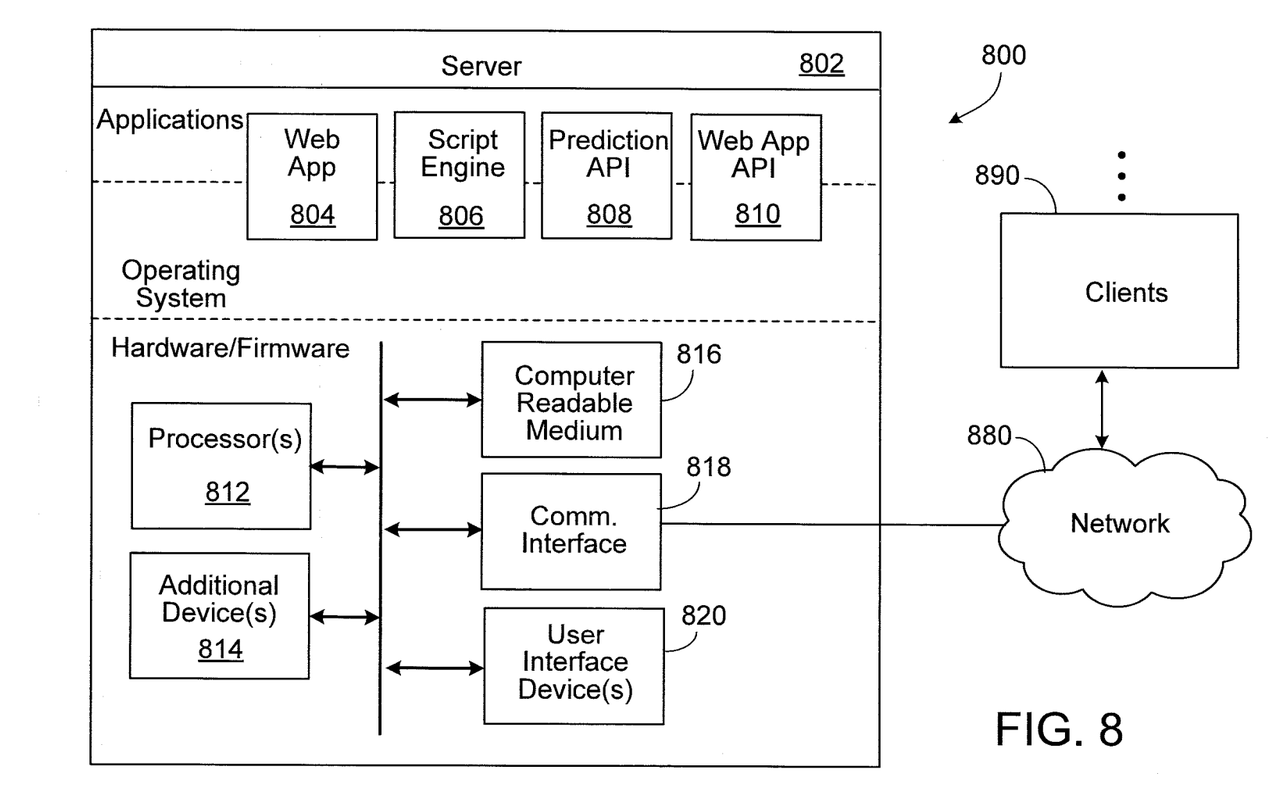
FIG. 8 is a schematic diagram of an example server.

FIG. 8 is a schematic diagram of an example server. The server 802 is optionally connected to one or more user or client computers 890 through a network 880. The server 802 consists of one or more data processing apparatuses. While only one data processing apparatus is shown in FIG. 8, multiple data processing apparatus can be used. The server 802 includes various software modules, e.g. executable software programs or libraries, including an web application 804, script engine 806, predictive modeling API 808, and web application API 810. Although several software modules are illustrated, there may be fewer or more software modules. Moreover, the software modules can be distributed on one or more data processing apparatus connected by one or more networks or other suitable communication mediums.

The server 802 also includes hardware or firmware devices including one or more processors 812, one or more additional devices 814, a computer readable medium 816, a communication interface 818, and one or more user interface devices 820. Each processor 812 is capable of processing instructions for execution within the server 802. In some implementations, the processor 812 is a single or multi-threaded processor. Each processor 812 is capable of processing instructions stored on the computer readable medium 816 or on a storage device such as one of the additional devices 814. The server 802 uses its communication interface 818 to communicate with one or more computers 890, for example, over a network 880. Examples of user interface devices 820 include a display, a camera, a speaker, a microphone, a tactile feedback device, a keyboard, and a mouse. The server 802 can store instructions that implement operations associated with the modules described above, for example, on the computer readable medium 816 or one or more additional devices 814, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server; or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device to (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
obtaining a database table, the table including a plurality of rows and a plurality of columns, wherein the database table has a plurality of missing column values;
executing a script, using a script engine, in response to obtaining the table, wherein executing the script causes a plurality of predictive models to be applied to the database table in a sequence order, and wherein the sequence order is determined according to a respective number of missing column values in the database table that each model can predict;
using each of the plurality of predictive models to generate respective output data, wherein the output data generated by each model includes a predicted value for at least one of the missing column values; and
populating the missing column values with the output data to provide a revised database table.

2. The computer-implemented method according to claim 1, wherein at least one of the predictive models comprises a customized predictive model.

3. The computer-implemented method according to claim 2, further comprising creating the customized predictive model based on a training dataset.

4. The computer-implemented method according to claim 3, wherein the training dataset includes the input data.

5. The computer-implemented method according to claim 3, wherein the training dataset includes data different from the input data.

6. The computer-implemented method of claim 2, wherein there are at least two missing column values in at least one of the table rows.

7. The computer-implemented method according to claim 2, further comprising selecting the customized predictive model from a plurality of different customized predictive models.

8. The computer-implemented method according to claim 7, further comprising training the plurality of customized predictive models, each predictive model being trained on a different arrangement of two or more missing column values in a particular table row.

9. The computer-implemented method of claim 1, wherein the sequence order is determined according to an increasing number of missing values that each model can predict.

10. The computer-implemented method of claim 9, wherein the database table comprises at least two columns containing missing values, and wherein executing the script causes a first predictive model configured to predict values for a corresponding column of the database table having the minimum number of missing values to be applied first in the sequence.

11. A system comprising:
one or more first computing devices configured to:
obtain a database table, the table including a plurality of rows and a plurality of columns, wherein the database table has a plurality of missing column values;
execute a script in response to obtaining the database table, wherein executing the script causes a plurality of predictive models to be applied to the database table in a sequence order, and wherein the sequence order is determined according to a respective number of missing column values in the database table that each model can predict;
process, using each of the plurality of predictive models to generate respective output data, wherein the output data generated by each model includes a predicted value for at least one of the missing column values; and
populate the missing column values with the output data to provide a revised database table.

12. The system according to claim 11, wherein at least one of the predictive models comprises a customized predictive model.

13. The system according to claim 12, wherein the one or more first computing devices are further configured to create the customized predictive model based on a training dataset.

14. The system according to claim 13, wherein the training dataset includes the input data.

15. The system according to claim 13, wherein the training dataset includes data different from the input data.

16. The system according to claim 12, wherein there are at least two missing column values in at least one of the table rows.

17. The system according to claim 12, wherein the one or more first computing devices are further configured to select the customized predictive model from a plurality of different customized predictive models.

18. The system according to claim 17, wherein the one or more first computing devices are further configured to train the plurality of customized predictive models, each predictive model being trained on a different arrangement of two or more missing column values in a particular table row.

19. A storage medium have instructions stored thereon that, when executed by data processing apparatus, cause the data processing apparatus to perform operations comprising:
obtaining a database table, the table including a plurality of rows and a plurality of columns, wherein the database table has a plurality of missing column values;
executing a script, using a script engine, in response to obtaining the table, wherein executing the script causes a plurality of predictive models to be applied to the database table in a sequence order, and wherein the sequence order is determined according to a respective number of missing column values in the database table that each model can predict;
processing, using each of the plurality of predictive models to generate respective output data, wherein the output data generated by each model includes a predicted value for at least one of the missing column values; and
populating the missing column values with the output data to provide a revised database table.

20. The storage medium according to claim 19, wherein at least one of the predictive models comprises a customized predictive model.

21. The storage medium according to claim 20, wherein the instructions, when executed by data processing apparatus, cause the data processing apparatus to perform further operations comprising creating the customized predictive model based on a training dataset.

22. The storage medium according to claim 21, wherein the training dataset includes the input data.

23. The storage medium according to claim 21, wherein the training dataset includes data different from the input data.

24. The storage medium according to claim 20, wherein there are at least two missing column values in at least one of the table rows.

25. The storage medium according to claim 20, wherein the instructions, when executed by data processing apparatus, cause the data processing apparatus to perform further operations comprising selecting the customized predictive model from a plurality of different customized predictive models.

26. The storage medium according to claim 25, wherein the instructions, when executed by data processing apparatus, cause the data processing apparatus to perform further operations comprising training the plurality of customized predictive models, each predictive model being trained on a different arrangement of two or more missing column values in a particular table row.

* * * * *